(12) United States Patent
Hasegawa et al.

(10) Patent No.: US 8,882,949 B2
(45) Date of Patent: Nov. 11, 2014

(54) TUBULAR BODY AND MANUFACTURING METHOD THEREOF

(75) Inventors: Hiroshi Hasegawa, Kobe (JP); Masahide Onuki, Kobe (JP)

(73) Assignee: SRI Sports Limited, Kobe (JP)

( * ) Notice: Subject to any disclaimer, the term of this patent is extended or adjusted under 35 U.S.C. 154(b) by 794 days.

(21) Appl. No.: 12/749,692

(22) Filed: Mar. 30, 2010

(65) Prior Publication Data
US 2010/0260955 A1 Oct. 14, 2010

(30) Foreign Application Priority Data
Apr. 9, 2009 (JP) ................. 2009-094459

(51) Int. Cl.
| | |
|---|---|
| B29C 70/32 | (2006.01) |
| B32B 27/36 | (2006.01) |
| B29C 70/34 | (2006.01) |
| B32B 37/00 | (2006.01) |
| B29C 53/58 | (2006.01) |
| A63B 53/10 | (2006.01) |
| B32B 27/32 | (2006.01) |
| B32B 1/08 | (2006.01) |
| B29C 53/80 | (2006.01) |
| A63B 59/00 | (2006.01) |
| B29C 63/10 | (2006.01) |
| B29L 23/00 | (2006.01) |

(52) U.S. Cl.
CPC ....... *B29C 53/581* (2013.01); *B29C 2053/8025* (2013.01); *A63B 59/0029* (2013.01); *B32B 27/36* (2013.01); *B29C 70/342* (2013.01); *B32B 37/00* (2013.01); *A63B 2209/023* (2013.01); *A63B 2209/026* (2013.01); *A63B 53/10* (2013.01); *B29C 63/10* (2013.01); *B32B 27/32* (2013.01); *B29C 70/32* (2013.01); *B29L 2023/22* (2013.01); *B32B 1/08* (2013.01)
USPC ............................ 156/187; 156/184; 156/188

(58) Field of Classification Search
USPC .......... 156/184, 189, 187, 188, 185, 175, 173
See application file for complete search history.

(56) References Cited

U.S. PATENT DOCUMENTS 3,457,962 A * 7/1969 Shobert .......................... 138/144
3,491,999 A * 1/1970 Lindler ............................ 482/18
(Continued)

FOREIGN PATENT DOCUMENTS

| JP | 10-272699 A | 10/1998 |
|---|---|---|
| JP | 2004-224979 A | 8/2004 |
| JP | 2006-124555 A | 5/2006 |

*Primary Examiner* — Jeff Aftergut
(74) *Attorney, Agent, or Firm* — Birch, Stewart, Kolasch & Birch, LLP

(57) ABSTRACT

A manufacturing method of the present invention includes the steps of: winding a fiber reinforced resin member containing a fiber and a matrix resin around a mandrel to obtain an intermediate formed body; winding a wrapping tape around the intermediate formed body with an application of a tension; heating the intermediate formed body to cure the matrix resin; and pulling the mandrel out and removing the wrapping tape after the step of heating to obtain a cured tubular body. A base polymer of a base material of the wrapping tape is a polyolefin resin and/or a polyester resin. The step of heating includes: a first heating stage for heating the intermediate formed body at a temperature of 70° C. or higher and 90° C. or lower for a time of 120 minutes or longer and 4320 minutes or shorter; and a second heating stage for heating the intermediate formed body at a temperature of 120° C. or higher and 200° C. or lower for a time of 5 minutes or longer and 20 minutes or shorter after the first heating stage.

16 Claims, 4 Drawing Sheets

(56) References Cited

U.S. PATENT DOCUMENTS

| | | | |
|---|---|---|---|
| 3,687,762 A * | 8/1972 | McLarty | 156/175 |
| 4,157,181 A * | 6/1979 | Cecka | 473/319 |
| 4,160,639 A * | 7/1979 | Umeda | 425/383 |
| 5,261,980 A * | 11/1993 | Pearce | 156/173 |
| 5,437,450 A * | 8/1995 | Akatsuka et al. | 473/320 |
| RE35,081 E * | 11/1995 | Quigley | 428/36.2 |
| 6,132,323 A * | 10/2000 | Smith et al. | 473/319 |
| 6,533,677 B1 * | 3/2003 | Sumitomo et al. | 473/316 |
| 6,767,422 B1 * | 7/2004 | Atsumi et al. | 156/184 |
| 2008/0070716 A1 * | 3/2008 | Kumamoto | 473/289 |

* cited by examiner

TUBULAR BODY AND MANUFACTURING METHOD THEREOF

This application claims priority on Patent Application No. 2009-94459 filed in JAPAN on Apr. 9, 2009, the entire contents of which are hereby incorporated by reference.

BACKGROUND OF THE INVENTION

1. Field of the Invention

The present invention relates to a manufacturing method of a tubular body made of a fiber reinforced resin, and a tubular body manufactured by the manufacturing method.

2. Description of the Related Art

In recent years, it has been desirable to develop a golf club shaft (hereinafter, referred to as a shaft) capable of increasing a flight distance by a small force with an increase in the number of elderly and female golf players with weak power. In particular, a reduction in a weight of the shaft has been supposed to be one of effective means for solving the problem, and various programs have been made.

As the programs, a change from steel to FRP (fiber reinforced plastic) can be taken. As a method of manufacturing the FRP tubular body, a sheet winding process and a filament winding process are well known. The sheet winding process winds a prepreg sheet around a mandrel (cored bar), further winds a wrapping tape, and thermally cures the prepreg sheet. The winding of the wrapping tape prevents the prepreg sheet from slipping from the mandrel in a heating step (curing step). The heating reduces the viscosity of a matrix resin of the prepreg sheet. However, the winding of the wrapping tape suppresses the deformation of a formed body.

For the conditions of the curing step, Paragraph [0032] of Japanese Patent Application Laid-Open No. 2004-224979 discloses a curing temperature of 80° C. or higher and 150° C. or lower, and a curing time of 1 hour or longer and 12 hours or shorter. FIG. 3 of Japanese Patent Application Laid-Open No. 2004-224979 describes temperature conditions in examples. Japanese Patent Application Laid-Open No. 2004-224979 uses several types of thermosetting epoxy resins as a matrix resin, and a polypropylene tape as a wrapping tape.

Japanese Patent Application Laid-Open No. 2006-124555 discloses a composition containing an epoxy resin, a curing agent and fullerenes as an epoxy resin composition for a fiber reinforced composite material. The gazette discloses conditions 130° C. and about 90 minutes as the conditions of the curing step.

SUMMARY OF THE INVENTION

Various factors determine the strength of the FRP tubular body. Examples of the factors include a thickness, an amount of a fiber, a direction of the fiber, a strength of the fiber itself, a rigidity of a resin, adhesiveness of a reinforced fiber to the resin. When a weight of the tubular body is reduced, these factors are preferably good.

The reduction of voids can contribute to enhancement in the adhesiveness of the reinforced fiber to the resin. The reduction of the voids contributes to enhancement in the strength of the FRP tubular body.

Examples of a method for reducing the voids include an autoclave method. In the typical autoclave method, the whole of a prepreg layered product is covered with a nylon bag or the like. The inside of the bag is made vacuum. The prepreg layered product is placed together with the bag in an autoclave, where the resin is cured.

However, the autoclave method requires a device which enables vacuuming and heating. The device is expensive. The autoclave method requires labor and time, resulting in low productivity.

Another examples of the method for reducing the voids include enhancement of a tension in winding a wrapping tape.

However, when the tension of the wrapping tape is too high, undulation and wrinkles may occur in the lamination. The undulation and the wrinkles reduce forming precision. The forming precision affects the strength.

It is an object of the present invention to provide a manufacturing method of a tubular body capable of improving a strength and a void rate, and the tubular body.

A manufacturing method of a tubular body of the present invention includes the steps of:

(1) winding a fiber reinforced resin member containing a fiber and a matrix resin around a mandrel to obtain an intermediate formed body;

(2) winding a wrapping tape around an outer peripheral surface of the intermediate formed body with an application of a tension;

(3) heating the intermediate formed body having the wrapping tape wound therearound to cure the matrix resin; and (4) pulling the mandrel out and removing the wrapping tape after the step of heating to obtain a cured tubular body.

A base polymer of a base material of the wrapping tape is a polyolefin resin and/or a polyester resin. The step of heating includes: a first heating stage for heating the intermediate formed body at a temperature of 70° C. or higher and 90° C. or lower for a time of 120 minutes or longer and 4320 minutes or shorter; and a second heating stage for heating the intermediate formed body at a temperature of 120° C. or higher and 200° C. or lower for a time of 5 minutes or longer and 20 minutes or shorter after the first heating stage.

Preferably, a tensile stress T1 to be applied to the wrapping tape is 20 (Mpa) or greater and 200 (Mpa) or less in the step of winding the wrapping tape.

Preferably, an internal surface of the wrapping tape is provided with a silicone type or fluorine type coating material.

Preferably, a fiber content S1 of the intermediate formed body is 50% by weight or greater and 92% by weight or less.

Preferably, a wind starting end and a wind terminating end of the wrapping tape are fixed respectively to the intermediate formed body with an adhesive tape in the step of winding the wrapping tape.

Preferably, the base material of the wrapping tape is a uniaxially-stretched film.

Preferably, a thickness d2 of the wrapping tape is equal to or greater than 10 μm and equal to or less than 120 μm.

Preferably, a width W1 of the wrapping tape is equal to or greater than 10 mm and equal to or less than 35 mm.

Preferably, a tensile modulus of elasticity of the fiber is equal to or higher than 5 t/mm² and equal to or lower than 100 t/mm².

Preferably, an average number La of a wrapping layer wound in the step of winding wrapping tape is equal to or larger than two.

Preferably, the average number La is equal to or larger than three and equal to or less than 15.

Preferably, the method further comprising steps of:

cutting off a portion Xt which is adjacent to a wind starting point and in which a number L1 of the wrapping layer is one; and cutting off a portion Yt which is adjacent to the wind terminating point and in which a number L1 of the wrapping layer is one.

Preferably, the wrapping tape is removed after the pull-out of the mandrel in the step of pulling out the mandrel and removing the wrapping tape.

Preferably, the temperature of the first heating stage is 85° C. or lower.

Preferably, the temperature of the first heating stage is 80° C. or lower.

Preferably, the temperature of the second heating stage is 130° C. or lower.

A tubular body of the present invention is manufactured by any one of the methods. More preferably, a void rate Rb of the tubular body is equal to or less than 0.5%.

A tubular body having an improved strength and void rate can be obtained.

DESCRIPTION OF THE PREFERRED EMBODIMENTS

The present invention will be described below in detail based on preferred embodiments with reference to the drawings.

A wrapping tape is used in a manufacturing method of the embodiment. A base polymer of a base material of the wrapping tape is any one of the following three types.
(1) A polyolefin resin
(2) A polyester resin
(3) A polyolefin resin and a polyester resin The wrapping tape may be obtained by laminating a layer made of a material other than the three types and layers made of the three types of materials. A wrapping tape made of the three types of materials and a wrapping tape made of the material other than the three types may be used together.

Figure 1:
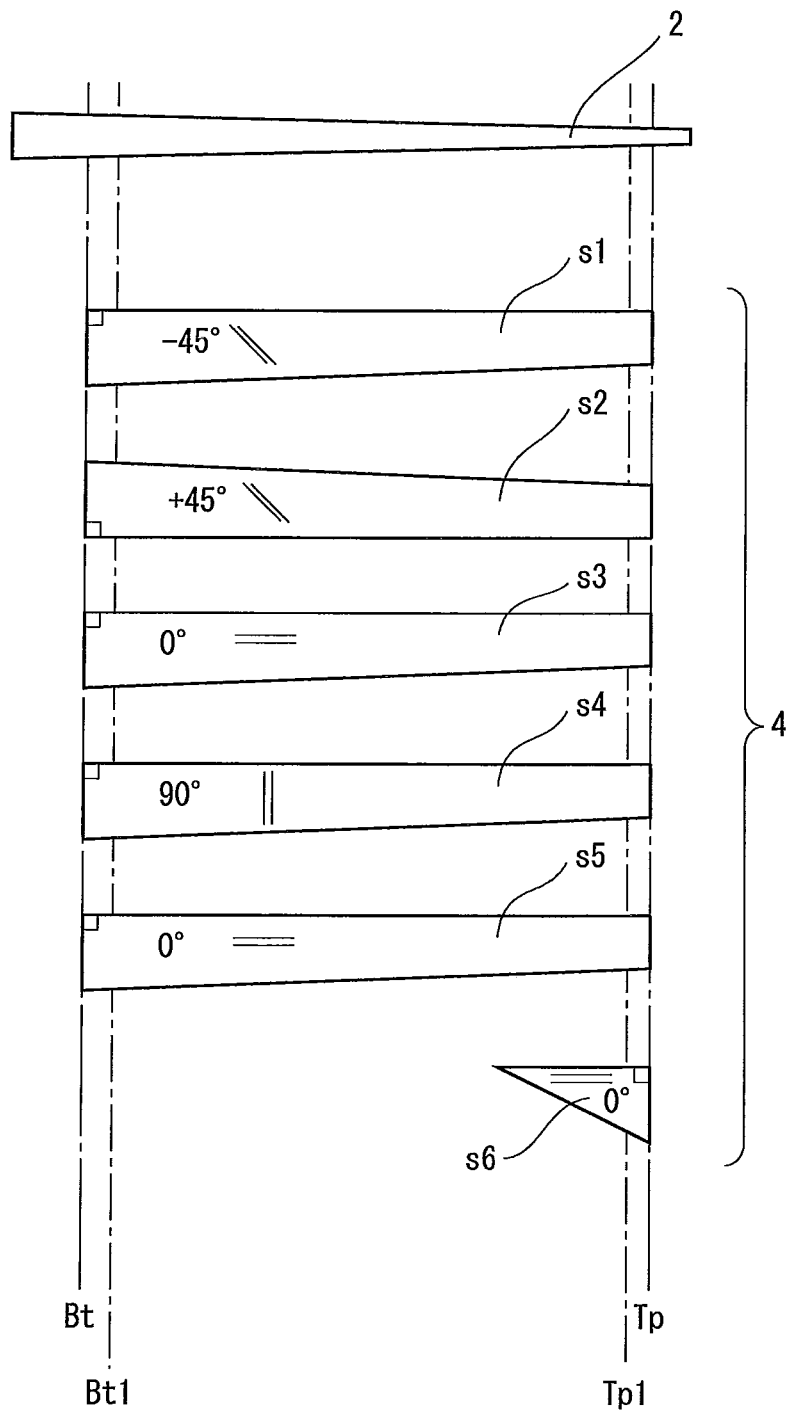
FIG. 1 is a diagram showing a mandrel and a prepreg which can be used in an embodiment according to the present invention.

FIG. 1 is a diagram for explaining a manufacturing method according to a first embodiment according to the present invention. Herein, as an example of a manufacturing method of a tubular body, description will be given to a manufacturing method of a golf club shaft. In the manufacturing method, first of all, a mandrel 2 and a fiber reinforced resin member 4 are prepared. A typical material of the mandrel 2 is a metal such as steel. A central axis of the mandrel 2 is an almost straight line. A sectional shape of the mandrel 2 is circular. The mandrel 2 has a taper. By the taper, the mandrel 2 becomes thinner toward one (tip) of ends thereof. The mandrel 2 may be partially parallel. In other words, the mandrel 2 may partially include a portion having a constant diameter. In the whole mandrel 2, the diameter may be constant.

The mandrel 2 forms a hollow portion of the tubular body finally obtained. A shape of the hollow portion of the tubular body is determined depending on a shape of the mandrel 2. As will be described below, the mandrel 2 is pulled out at a subsequent step. In order to easily carry out the pull-out, it is preferable that a surface of the mandrel 2 is coated with a lubricant.

In the embodiment, a step of winding a fiber reinforced resin member around a mandrel is carried out. The step will be hereinafter referred to as a winding step.

Prior to the winding step, the fiber reinforced resin member is prepared. In the present embodiment, the fiber reinforced resin member is sheet-shaped. The fiber reinforced resin member is a prepreg 4. In the manufacturing method, the sheet-shaped fiber reinforced resin member is wound. The manufacturing method is also referred to as a sheet winding process. For the fiber reinforced resin member, a fiber impregnated with a liquid resin is exemplified in addition to the prepreg 4. An example of a process using the fiber includes a so-called filament winding process. The manufacturing method can also be applied to the filament winding process.

The prepreg 4 includes a fiber and a matrix resin. The fiber is a carbon fiber. The carbon fiber of the prepreg 4 is oriented in one direction. Such a prepreg is also referred to as a UD prepreg. "UD" stands for unidirection. A prepreg which is not the UD prepreg may be employed. For example, a prepreg obtained by weaving a carbon fiber may be employed. As will be described below, fibers other than the carbon fiber may be employed. In respect of obtaining a tubular body having a high strength and a small weight, the carbon fiber is preferable. At the winding step, the matrix resin is not completely cured. Accordingly, the prepreg 4 has a flexibility. The flexibility permits the wind of the prepreg 4 around the mandrel 2. As will be described below, the matrix resin is not restricted but an epoxy resin is preferred.

The type of the epoxy resin is not restricted. Examples thereof include a bisphenol A type epoxy resin, a bisphenol F type epoxy resin, a polyfunctional type epoxy resin, a flexible epoxy resin, a brominated epoxy resin, and a glycidyl ester type epoxy resin. An example of a preferable epoxy resin is a matrix resin used for any one of prepregs shown in examples to be described below and manufactured by Toray Industries, Inc. (Table 3).

Before the winding step, the prepreg 4 is cut to have a desirable shape. In the embodiment shown in FIG. 1, six prepregs 4 are used. In the embodiment shown in FIG. 1, sheets s1 to s6 are shown as an example of the prepreg 4 which is cut. The prepreg 4 includes the sheets s1 to s2 for so-called angle layers, the sheets s3, s5, and s6 for straight layers and the sheet s4 for hoop layer. The prepreg 4 includes the full length sheets s1 to s5 provided over a full length of the shaft and the partial sheet s6 provided in a part in a longitudinal direction of the shaft. The specification of the prepreg 4 is not restricted. A shape, a thickness, a fiber type, a fiber content or the like of the prepreg 4 are not restricted.

At the winding step, the sheets s1 to s6 are sequentially wound around the mandrel 2. Prior to the wind, the sheet s2 is laminated on the sheet s1. The sheet group thus laminated is wound around the mandrel 2. In the lamination, the sheet s2 is turned over. By the turnover, a fiber of the sheet s1 and that of the sheet s2 are oriented in reverse directions to each other. In FIG. 1, angles described in the sheets s1 to s6 indicate an angle formed by an axial direction of the shaft and an orientation of the fiber.

For example, the sheets s1 to s6 are manually wound. A winding machine (which is also referred to as a rolling machine) may be used. An intermediate formed body 6 is obtained through the winding step. The intermediate formed body 6 is constituted by the wound prepreg 4. A section of the intermediate formed body 6 is formed by a whorl-like layer. The layer is formed by the prepreg 4.

Figure 2:
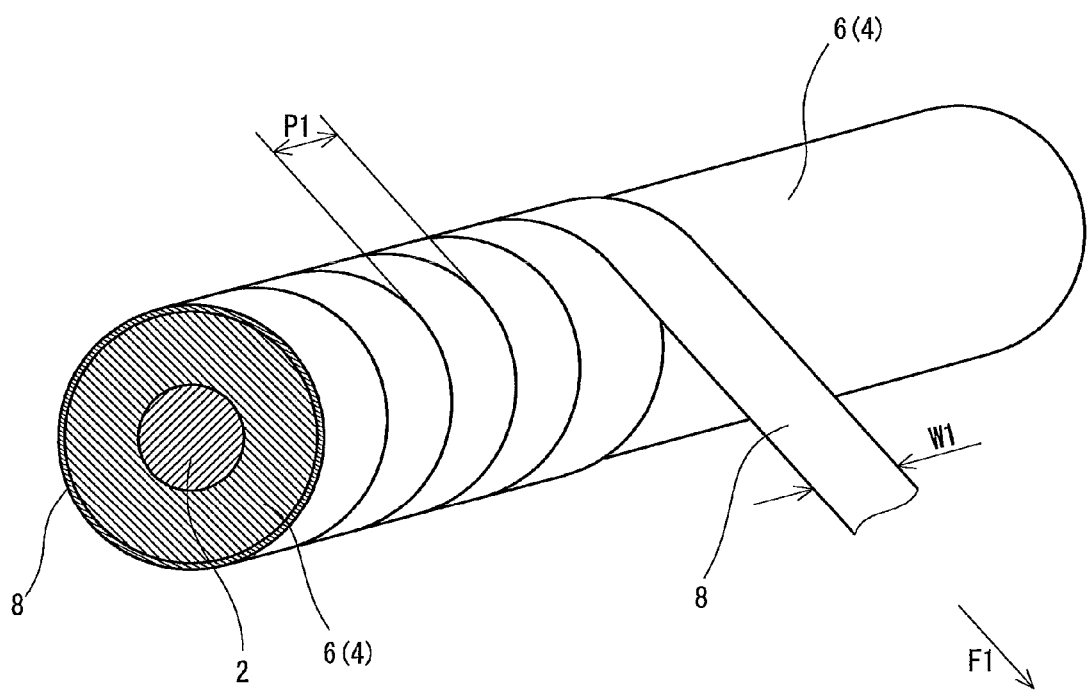
FIG. 2 is a partially sectional perspective view showing an example of a tape winding step.
Figure 3:
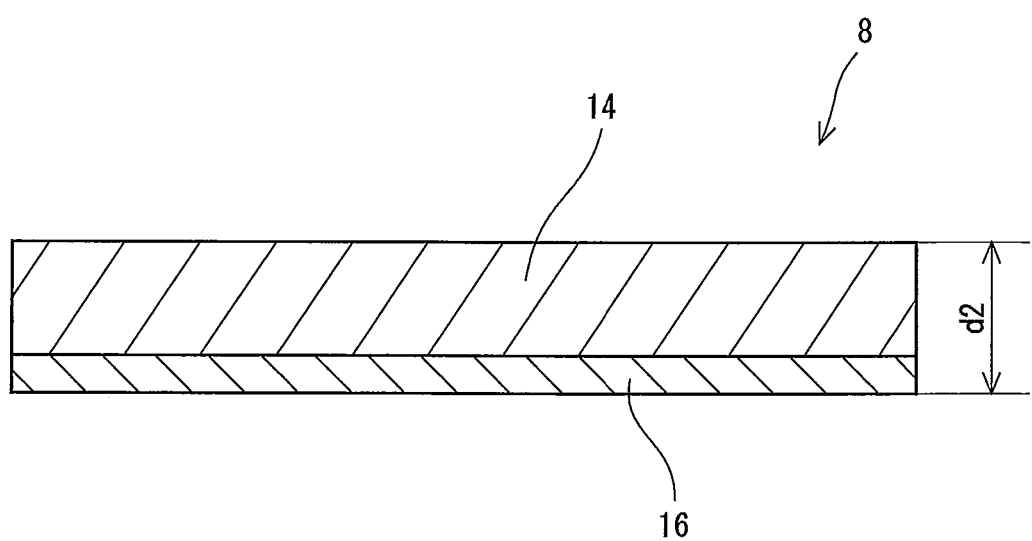
FIG. 3 is a sectional view of an example of a wrapping tape.

Next, a tape winding step is executed. At the tape winding step, a wrapping tape 8 is wound around an outer peripheral surface of the intermediate formed body 6. FIGS. 2 and 3 are partially sectional perspective views showing a state of the tape winding step. In sections of FIGS. 2 and 3, the intermediate formed body 6 is schematically shown as a single layer. Actually, the intermediate formed body 6 is formed by a plurality of layers as described above.

A base polymer of a base material of the wrapping tape 8 is any one of the following three types as described above.
(1) A polyolefin resin
(2) A polyester resin
(3) A polyolefin resin and a polyester resin At the tape winding step, the wrapping tape 8 is directly wound around the outer peripheral surface of the intermediate formed body 6. The outer peripheral surface of the intermediate formed body 6 abuts on the wrapping tape 8. The wrapping tape 8 is brought into contact with the outer peripheral surface of the intermediate formed body 6.

As shown in FIG. 2, the wrapping tape 8 is spirally wound at the tape winding step. In order to carry out the spiral winding, an axial direction of the intermediate formed body 6 is not perpendicular to a longitudinal direction of the wrapping tape 8. The wrapping tape 8 is wound around the intermediate formed body 6 without a gap. In order to eliminate the gap, a width W1 of the wrapping tape 8 is greater than a winding pitch P1. The winding pitch P1 is shown in a double arrow in FIG. 2. In other words, the wrapping tape 8 is spirally wound in a partial overlap in a transverse direction thereof. The wrapping tape 8 is wound by a heretofore known wrapping machine. The wrapping tape 8 is wound over a full length of the intermediate formed body 6. As a result of the tape winding step, the whole intermediate formed body 6 is covered with the wrapping tape 8. Both ends (a wind starting end and a wind terminating end) of the wrapping tape 8 are fixed to the intermediate formed body 6 with an adhesive tape or the like. By fixing both of the ends, the wrapping tape 8 can be prevented from being unwound spontaneously.

The wrapping tape 8 is wound with an application of a tension F1. By the tension F1, the intermediate formed body 6 is fastened with the wrapping tape 8. By this tape winding step, a covered body obtained by covering the intermediate formed body 6 with the wrapping tape 8 is produced.

Next, a curing step is carried out. The covered body is heated at the curing step (heating step). At the curing step, in the intermediate formed body 6 around which the wrapping tape 8 is wound, the curing of the matrix resin advances. The curing step indicates a heating step. Heating is carried out by a heating furnace.

The curing step includes a first heating stage and a second heating stage. Preferably, the curing step includes a first rising temperature stage before a temperature of the first heating stage is reached, the first heating stage, a second rising temperature stage before a temperature of the second heating stage is reached from the temperature of the first heating stage, and the second heating stage. The second heating stage is carried out after the first heating stage. The temperature of the first heating stage is lower than that of the second heating stage.

The temperature of the first heating stage is set to 70° C. or higher and 90° C. or lower. A time of the first heating stage is set to 120 minutes or longer and 4320 minutes or shorter. The temperature of the first heating stage may be constant and may change. In respect of suppressing variation of curing degree, it is preferable that the temperature of the first heating stage is constant.

The temperature of the second heating stage is set to 120° C. or higher and 200° C. or lower. A time of the second heating stage is set to 5 minutes or longer and 20 minutes or shorter. The temperature of the second heating stage may be constant and may change. In respect of suppressing variation of curing degree, it is preferable that the temperature of the second heating stage is constant.

A prepreg contains bubbles. The bubbles are taken at the manufacturing stage of the prepreg. The bubbles may remain also in the accomplished shaft. The bubbles reduce the strength of the shaft. When the prepreg has a large void rate, the shaft has a low strength.

Large bubbles are apt to become starting points of cracking of the shaft as compared with small bubbles. The large bubbles reduce the strength of the shaft.

As described above, the temperature of the first heating stage is low. Since the temperature of the first heating stage is low, the thermal expansion of the bubbles is low. Since the thermal expansion is low, the bubbles hardly grow larger. At the first heating stage, the curing of the matrix resin advances while the thermal expansion of the bubbles is suppressed. Since the curing of the matrix resin advances at the first heating stage, the thermal expansion of the bubbles is less likely to occur at the time of transfer to the second heating stage. The time of the first heating stage is made long, whereby the curing of the matrix resin at the first heating stage further advances. When the curing of the matrix resin is advanced by the first heating stage, the thermal expansion of the bubbles at the second heating stage is further less likely to occur.

Since the matrix resin is heated at the first heating stage, the matrix resin can be fluidized. Particularly, the matrix resin can be fluidized at the initial stage of the first heating stage. The fluidization of the matrix resin can move the bubbles in the matrix resin. The bubbles can be combined with each other with the movement. When the bubbles are combined with each other, larger bubbles can be generated. As described above, the large bubbles reduce the strength of the shaft. However, in the embodiment, the temperature of the first heating stage is low. The low temperature causes a high viscosity of the matrix resin. The high viscosity causes less movement of the bubbles at the first heating stage. At the first heating stage, the bubbles are less likely to be combined with each other. The first heating stage of the low temperature can suppress the combination of the bubbles. The first heating stage of the low temperature can suppress the growth of the bubbles caused by the combination of the bubbles. The first heating stage of the low temperature can suppress the generation of the large bubbles.

In respects of suppressing the thermal expansion of the bubbles and of suppressing the combination of the bubbles, the temperature of the first heating stage is equal to or lower than 90° C., more preferably equal to or lower than 85° C., and still more preferably equal to or lower than 80° C. or less.

In respects of promoting the curing at the first heating stage and of suppressing the thermal expansion of the bubbles at the second heating stage, the temperature of the first heating stage is preferably equal to or higher than 70° C.

In respects of promoting the curing at the first heating stage and of suppressing the thermal expansion of the bubbles at the second heating stage, the time of the first heating stage is preferably equal to or longer than 120 minutes, and more preferably equal to or longer than 180 minutes.

In respect of the productivity of the shaft, the time of the first heating stage is preferably equal to or shorter than 4320 minutes, and more preferably equal to or shorter than 1440 minutes.

The prolonged first heating stage advances the curing of the matrix resin considerably. However, since the temperature of the first heating stage is low, the curing of the matrix resin is not perfect. Therefore, the second heating stage is carried out.

By the second heating stage of the high temperature, the matrix resin can be completely cured.

In respect of promoting the curing of the matrix resin, the temperature of the second heating stage is preferably equal to or higher than 120° C., and more preferably equal to or higher than 130° C. In respect of reducing an energy cost required for manufacturing the shaft, the temperature of the second heating stage is preferably equal to or lower than 200° C., and more preferably equal to or lower than 150° C.

In respect of promoting the curing of the matrix resin, the time of the second heating stage is preferably equal to or longer than 5 minutes, and more preferably equal to or longer than 10 minutes. In respect of the productivity of the shaft, the time of the second heating stage is preferably equal to or shorter than 20 minutes, and more preferably equal to or shorter than 15 minutes.

The temperature of the curing step may mean a temperature of air in the heating furnace (oven). The temperature of the curing step may mean a surface temperature of the wrapping tape at the curing step.

After the curing step, there is executed a step of pulling out the mandrel 2 and removing the wrapping tape 8 to obtain a cured tubular body. Either the pull-out of the mandrel 2 or the removing of the wrapping tape may be carried out first. In respect of a workability, it is preferable that the wrapping tape is removed after the pull-out of the mandrel 2.

The cured tubular body is usually subjected to finishing to obtain a tubular body to be a final product. The finishing can include cutting of both ends, surface polishing, and coating.

FIG. 3 is a sectional view of the wrapping tape 8. The wrapping tape 8 has a base material 14 made of a resin film and a coating agent 16. The coating agent 16 forms a layer. The wrapping tape 8 has a two-layer structure including the base material 14 and the coating agent 16. The coating agent 16 is provided on an internal surface of the base material 14. For the coating agent 16, a fluorine type compound and a silicone type compound are preferred. The wrapping tape 8 may consist of the base material 14.

As described above, the wrapping tape 8 is wound with the application of the tension F1. Herein, there is defined a tensile stress T1 to be applied to the wrapping tape 8 at the tape winding step. The tensile stress T1 is obtained by dividing the tension F1 by a sectional area Ds of the wrapping tape 8. More specifically, [T1=F1/Ds] is set. The sectional area Ds is measured in the wrapping tape 8 in a state in which the tension does not act (a free state). The tensile stress T1 implies a tensile stress acting on the wrapping tape 8 immediately before winding. The tensile stress T1 does not imply a tensile stress which acts on the wrapping tape 8 in a winding state.

In respect of increasing the amount of the bubbles discharged to the outside of the wrapping tape 8, the tensile stress T1 is preferably equal to or higher than 20 Mpa, more preferably equal to or higher than 30 Mpa, and still more preferably equal to or higher than 40 Mpa. In respect of suppressing the cutting of the wrapping tape 8, the tensile stress T1 is preferably equal to or less than 200 Mpa, more preferably equal to or less than 180 Mpa, and still more preferably equal to or less than 150 Mpa.

The fiber content S1 of the intermediate formed body 6 is not restricted. In respect of increasing the rigidity and strength of the FRP tubular body, the fiber content S1 is preferably equal to or higher than 50% by weight, more preferably equal to or higher than 60% by weight, and still more preferably equal to or higher than 70% by weight. When the fiber content S1 is excessively large, the tack property of the prepreg is reduced. In other words, when the fiber content S1 is excessively high, the prepregs are apt to be hard to stick to each other to cause defective windings such as wrinkles. In respects of enhancing the productivity in a winding operation and of suppressing the defective windings, the fiber content S1 is preferably equal to or lower than 92% by weight, more preferably equal to or lower than 85% by weight, still more preferably equal to or lower than 80% by weight, and particularly preferably equal to or lower than 75% by weight. The fiber content S1 of the intermediate formed body 6 is equal to the fiber content of the fiber reinforced resin member (the prepreg 4). The fiber content S1 can be determined based on product data of the fiber reinforced resin member (the prepreg 4).

The base polymer of the base material 14 of the wrapping tape 8 is any one of the following three types. Preferably, three types of the resins are formed into a film.

(1) A polyolefin resin
(2) A polyester resin
(3) A polyolefin resin and a polyester resin Polyethylene and polypropylene are exemplified as the polyolefin resin (1). As polyethylene, high-density polyethylene (HDPE), low-density polyethylene (LDPE), very low-density polyethylene (VLDPE), linear low-density polyethylene (LLDPE), and ultrahigh molecular weight polyethylene (UHMW-PE) are exemplified. In respects of easiness of forming and a cost, polypropylene is preferred.

The polymer molecule of the polyolefin resin may be a copolymer. When a weight ratio R1 of a raw material olefin monomer to the total weight of a raw material before polymerization is equal to or higher than 50% by weight, the raw material olefin monomer is used for the polyolefin resin in the present application. The ratio R1 is preferably equal to or higher than 60% by weight, more preferably equal to or higher than 70% by weight, and still more preferably equal to or higher than 80% by weight. The ratio R1 may be 100% by weight.

As the polyester resin (2), polyethylene terephthalate (PET), polybutylene terephthalate (PBT), polytrimethylene terephthalate (PTT), polyethylenenaphthalate (PEN), and polybutylene naphthalate (PBN) are exemplified. In respects of easiness of forming and a cost, polyethylene terephthalate (PET) is preferred.

The polyester resin may be obtained by copolymerizing monomers other than raw material monomers (multivalent carboxylic acid and polyalcohol forming ester bonds). When a weight ratio R2 of the raw material monomer to the total weight of a raw material before polymerization is equal to or higher than 50% by weight, the raw material monomer is used for the polyester resin in the present application. The ratio R2 is preferably equal to or higher than 60% by weight, more preferably equal to or higher than 70% by weight, and still more preferably equal to or higher than 80% by weight. The ratio R2 may be 100% by weight.

As the item (3), a resin obtained by blending the polyolefin resin with the polyester resin is exemplified. As the other example of the item (3), a film obtained by laminating a layer made of the polyolefin resin and a layer made of the polyester resin is exemplified.

Preferably, the wrapping tape 8 contracts in a temperature region in which a viscosity of the matrix resin is reduced. Preferably, the wrapping tape 8 contracts in the temperature range of the first heating stage. The contraction can enhance a tightening force to promote the discharge of the voids. In respect of the contraction, the film (composite resin film) obtained by laminating the layer made of the polyolefin resin and the layer made of the polyester resin is preferred.

These resin materials have a comparatively high tensile strength. The tensile stress T1 can be increased by using these resins. The large tensile stress T1 contributes to the discharge of the voids. The large tensile stress T1 contributes to the reduction of the void rate.

The base material of the wrapping tape 8 may be a non-stretched film, a uniaxially-stretched film, or a biaxially-stretched film. In respects of the tensile strength and the contractility in the longitudinal direction of the tape, the uniaxially-stretched film is preferred. It is preferable that the stretching direction is the longitudinal direction of the tape.

Resins other than the polyolefin resin and the polyester resin may be used for the wrapping tape 8. For example, the resins may be used with a polyamide resin. As the wrapping tape 8, a composite material of a polyolefin resin film or a polyester resin film, and a textile made of a polyamide resin is exemplified. As the composite material, an integrated tape used in example to be described below is exemplified.

A thickness d2 of the wrapping tape 8 is not restricted. In respect of preventing the wrapping tape 8 from being cut by the tension F1, the thickness d2 of the wrapping tape 8 is preferably equal to or greater than 10 μm, more preferably equal to or greater than 15 μm, still more preferably equal to or greater than 20 μm, and particularly preferably equal to or greater than 25 μm. In respects of suppressing the generation of the wrinkles and of reducing the cost, the thickness d2 of the wrapping tape 8 is preferably equal to or less than 150 μm, more preferably equal to or less than 120 μm, still more preferably equal to or less than 100 μm, and particularly preferably equal to or less than 50 μm.

The width W1 of the wrapping tape 8 is not restricted. Both edges in the transverse direction of the wrapping tape 8 produces a level difference in the intermediate formed body 6. That is, in the cured tubular body, a spiral level difference occurs as winding marks of the wrapping tape 8. In respect of suppressing the level difference, the width W1 is preferably equal to or greater than 10 mm, more preferably equal to or greater than 12 mm, and still more preferably equal to or greater than 14 mm. In respect of suppressing the wrinkles in the winding, the width W1 is preferably equal to or less than 35 mm, more preferably equal to or less than 30 mm, and still more preferably equal to or less than 25 mm.

The fiber of the fiber reinforced resin member is not restricted. Examples of the fiber include an inorganic fiber, an organic fiber and a metal fiber. Examples of the inorganic fiber include a carbon fiber, a glass fiber, a boron fiber, a silicon carbide fiber, and an alumina fiber. Examples of the organic fiber include a polyethylene fiber and a polyamide fiber. A plurality of fibers may be combined. In respect of obtaining a tubular body having a small weight while maintaining a rigidity required for a golf club shaft, a tensile modulus of elasticity of a fiber is preferably equal to or higher than 5 t/mm$^2$, more preferably equal to or higher than 10 t/mm$^2$, and still more preferably equal to or higher than 24 t/mm$^2$. In respect of an availability of the fiber, it is preferable that the tensile modulus of elasticity of the fiber is equal to or lower than 100 t/mm$^2$. The tensile modulus of elasticity is measured in accordance with JIS R7601: 1986 "Testing Method for Carbon Fibers". The tensile modulus of elasticity is described in product data of prepreg maker.

In respect of raising the pressure to be applied to the intermediate formed body 6, an average number La of the wrapping layer is preferably equal to or larger than one, more preferably equal to or larger than two, still more preferably equal to or larger than three, and particularly preferably equal to or larger than five. When the average number La of the wrapping layer is excessively large, an increase in the cost of the wrapping tape 8 and an increase in a time and labor for peeling the wrapping tape 8 are occurred. When the average number La of the wrapping layer is excessively large, the wrinkles are apt to be generated on the surface of the intermediate formed body 6. In these respects, the average number La of the wrapping layer is preferably equal to or less than 15, more preferably equal to or less than 12, and still more preferably equal to or less than 10.

The average number La of the wrapping layer is an average value of the number L1 of the wrapping layer in each point on the surface of the intermediate formed body 6. Specifically, the average number La of the wrapping layer can be determined in accordance with the following equation (1).

$$La = St/Sn \qquad (1)$$

In the equation (1), St represents a total area (mm$^2$) of the internal surface of the wrapping tape 8 in a winding state and Sn represents a surface area (mm$^2$) of the intermediate formed body 6 in a portion coming in contact with the wrapping tape 8 which is wound. The total area St is a product of a length Nt (mm) of the wrapping tape 8 which is wound and a width Wa (mm) of the wrapping tape 8. More specifically, St=Nt×Wa is set. The length Nt is measured in the longitudinal direction of the wrapping tape 8. The length Nt is substantially equal to or greater than a length Nk of the wrapping tape 8 which is measured in an unwinding state from the intermediate formed body 6. When Nt>Nk can be set, the wrapping tape 8 is wound in a stretching state with a tension. The width Wa is substantially equal to or less than the width W1 of the wrapping tape 8 which is measured in an unwinding state from the intermediate formed body 6. When W1>Wa can be set, the wrapping tape 8 is wound in the stretching state with the tension. The average number La of the wrapping layer is not the integer in some cases.

For example, when the ratio (P1/W1) is 0.5, W1=Wa is set, and the winding number is one, the average number La of the wrapping layer is two. If an error of the winding pitch P1 is disregarded in this case, the number L1 of the wrapping layer is two in all of the points.

The total area St and the surface area Sn are measured within a range from a tip end position Tp1 of the tubular body to a butt end position Bt1 of the tubular body. As described above, both of ends of the cured tubular body may be cut in the finishing step for the manufacture of the tubular body. When both of the ends are cut, the tip end position Tp1 of the tubular body is different from the tip end position Tp of the cured tubular body (see FIG. 1). When either of the ends is not cut, the tip end position Tp1 of the tubular body is coincident with the tip end position Tp of the cured tubular body. Similarly, when both of the ends are cut, the butt end position Bt1 of the tubular body is different from a butt end position Bt of the cured tubular body. When neither of the ends is cut, the butt end position Bt1 of the tubular body is coincident with a butt end position Bt of the cured tubular body.

In respect of raising the pressure to be applied to the intermediate formed body 6, the number L1 of the wrapping layer is preferably equal to or larger than one, more preferably equal to or larger than two, still more preferably equal to or larger than three, and particularly preferably equal to or larger than five in all of the points from the tip end position Tp1 to the butt end position Bt1. When the number L1 of the wrapping layer is excessively large, an increase in the cost of the wrapping tape 8 and an increase in a time and labor for peeling the wrapping tape 8 may be occurred. When the number L1 of the wrapping layer is excessively large, the wrinkles are apt to be generated on the surface of the intermediate formed body 6. From these viewpoints, the number L1 of the wrapping layer is preferably equal to or less than 15, more preferably equal to or less than 12, and still more preferably equal to or less than 10 in all of the points from the tip end position Tp1 to the butt end position Bt1.

Irrespective of a value of the average number La of the wrapping layer, when the winding number is one, a portion in which the number L1 of the wrapping layer is one is present in both of ends of the winding portion. For example, even when the average number La of the wrapping layer is set to two or more, the portion in which the number L1 of the wrapping layer is one is present in the wind starting portion and the wind terminating portion as long as the winding number is one. A portion Xt which is adjacent to the wind starting point and in which the number L1 of the wrapping layer is one has a tendency to have a smaller tightening force as compared with the other portions. Therefore, the voids remain at comparatively high probability in the portion Xt. Accordingly, a tubular body (a shaft) obtained by cutting off the portion Xt is more preferred. Similarly, a portion Yt which is adjacent to the wind terminating point and in which the number L1 of the wrapping layer is one has a tendency to have a smaller tightening force as compared with the other portions. Accordingly, a tubular body (a shaft) obtained by cutting off the portion Yt is more preferred. A portion having, on both sides in an axial direction, the portion in which the number L1 of the wrapping layer is two or more does not correspond to the portion Xt even if the number L1 of the wrapping layer is one. Similarly, a portion having, on the both sides in the axial direction, the portion in which the number L1 of the wrapping layer is two or more does not correspond to the portion Yt even if the number L1 of the wrapping layer is one. The axial direction implies an axial direction of the tubular body.

The winding number implies the number of the winding operations for winding the wrapping tape 8 in one direction. The one direction implies a direction from the tip side toward the butt side or a direction from the butt side toward the tip side. When one winding operation is carried out one time in one direction, it is defined that the winding number is one.

At the winding step, the wrapping tape 8 may be wound being reciprocated between the tip side and the butt side. For example, the wrapping tape 8 may be wound spirally from the butt side toward the tip side, and subsequently, the wrapping tape 8 may be wound spirally from the tip side toward the butt side. By the winding operation of the reciprocating type, the winding number may be increased. In the present application, even when one reciprocating winding operation is carried out by the winding operation of the reciprocating type, it is defined that the winding number is two. Even when one reciprocating winding operation is carried out without cutting the wrapping tape 8 in the middle, it is defined that the winding number is two. In respect of the productivity, a method for reducing the ratio (P1/W1) is preferred for a method of increasing the average number La of the wrapping layer. In this case, even when the winding number is one, the average number La of the wrapping layer can be increased. From this viewpoint, the ratio (P1/W1) is preferably equal to or less than 0.5, more preferably equal to or less than 0.3, and still more preferably equal to or less than 0.2. In respect of the productivity, the ratio (P1/W1) is preferably equal to or greater than 0.04, and more preferably equal to or greater than 0.06.

EXAMPLES

Although the advantages of the present invention will be apparent from examples, the present invention should not be construed restrictively based on description of the examples.

First of all, a valuation method will be described.

[Measurement of Forward Flex]

An upper side of a position placed apart from a butt end Bt of a cured tubular body by 75 mm and a lower side of a position placed apart from the butt end Bt by 215 mm were set to support points. In a state in which these two points are supported, an axial direction of the cured tubular body was set to be horizontal. Next, a weight of 2.7 kg was applied to a load point K placed apart from the butt end Bt by 1039 mm. The cured tubular body was bent by the weight so that the load point K was moved downward. A moving amount in a vertical direction of the load point K is shown as a forward flex Fj in the following Tables 1 and 2.

A high shaft rigidity per unit weight can contribute to a lightweight. From this viewpoint, a value (Fj/Wt) obtained by dividing the forward flex Fj by a weight Wt of the cured tubular body is preferably small.

[Thickness of Wrapping Tape 8]

The thickness d2 of the wrapping tape 8 was measured by using a digimatic micrometer in accordance with the JIS L 1096. A constant pressure of 240 g/cm$^2$ was applied, the state was held for ten seconds, and the measurement was then carried out with the pressure of 240 g/cm$^2$ applied. The measurement was carried out in five places. An average value of data in the five places is shown as "thickness d2" in the following Table.

[Void Rate Rb]

A void area Sb and a cross sectional area Sm of a shaft were obtained by an image of a cross section of a position placed apart from a tip of a shaft by 90 mm, and a void rate Rb was calculated in accordance with the following equation.

$$Rb(\%)=(Sb/Sm)\times 100$$

Since a head is attached to a tip part of a golf club shaft, the strength of the tip part is particularly important. The void rate Rb has a high correlation with the strength of the shaft.

[Three-Point Bending Strength]

Figure 4:
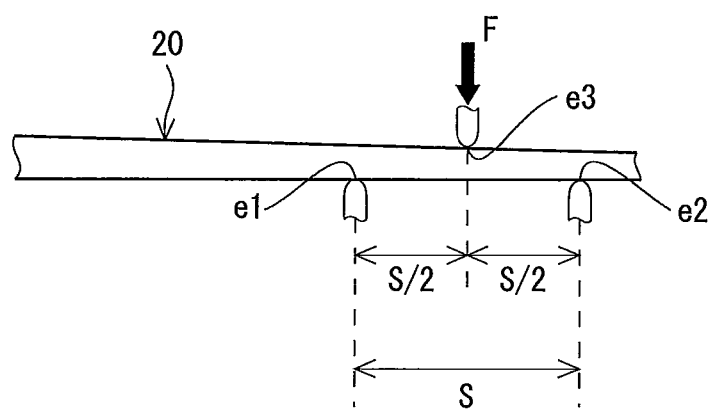
FIG. 4 is a diagram showing a measuring method of a three-point bending strength.

An SG type three-point bending strength test was used. This is a test set by Consumer Product Safety Association. FIG. 4 shows a measuring method of the SG type three-point bending strength test. As shown in FIG. 4, a load F is applied downward from above at a load point e3 while a shaft 20 is supported from below at two supporting points e1 and e2. The load point e3 is placed at a position bisecting a distance between the supporting points e1 and e2. The load point e3 is a measuring point. The measuring points were set to a point T, a point A, a point B, and a point C. The point T is placed apart from a tip end position Tp by 90 mm. The point A is placed apart from the tip end position Tp by 175 mm. The point B is placed apart from the tip end position Tp by 525 mm. The point C is placed apart from the butt end position Bt by 175 mm. A value (peak value) of the load F when the shaft 20 was broken was measured. When the bending strength is measured at the point T, the distance between the supporting points e1 and e2 (a span S) is set to 150 mm. When the bending strength is measured at the point A, the point B, and the point C, the span S is set to 300 mm.

The measurement result of the three-point bending strength at the point T is shown in the following Table.

[Productivity]

In accordance with the following standards, the productivity was evaluated in four stages. The evaluation A means the highest productivity (goodness). The evaluation D means the lowest productivity.

A: The heating time at the curing step is within 4 hours.
B: The heating time at the curing step is longer than 4 hours and within 24 hours.
C: The heating time at the curing step is longer than 24 hours and within 72 hours.
D: The heating time at the curing step is longer than 72 hours.

Example 1

The mandrel shown in FIG. 1 was coated with a lubricant (release agent), and six prepregs were then wound around the mandrel to obtain an intermediate formed body. Structures of the six prepregs are shown in FIG. 1. Types and structures of the prepregs of the sheets s1 to s6 are shown in the following Table 3. The sheets s1 to s6 are the prepregs manufactured by Toray Industries, Inc. "Tip ply number" in the Table 3 indicates the number of winds of the prepreg on the tip end Tp. "Fiber angle" in the Table 3 indicates an orientation angle of a carbon fiber with respect to an axial direction of a shaft. In each of the prepregs, an epoxy resin is used for a matrix resin. An item number of each of the prepregs and a type (item number) of the carbon fiber are shown in the Table 3.

Next, there was executed a tape winding step of winding a wrapping tape around an outer peripheral surface of the intermediate formed body. The tape winding step was carried out by a wrapping machine manufactured by YOKOTE TEKKO-SHO. The tape winding step was carried out with an application of a certain tension F1. The tension F1 was measured by a load cell manufactured by NIDEC-SHIMPO CORPORATION. A tensile stress T1 was calculated based on the tension F1.

At the winding step, a wrapping tape 8 was wound. For the wrapping tape 8, a polypropylene (PP) film tape was used. For the PP film tape, "PT-30H" manufactured by SHIN-ETSU FILM CO., LTD. was used. A silicone type coating agent is provided on a single side of the film tape. The PP film tape was wound with the coating agent layer set to an inside. The PP film tape had a width W1 of 25 mm and a thickness d2 of 30 μm. The tensile stress T1 was set to 100 Mpa. A winding pitch P1 was set to 2 mm. The winding number was set to one.

After the tape winding step, a curing step was carried out. At the curing step, a second heating stage was carried out after a first heating stage. At the first heating stage, heating was executed at 80° C. for 120 minutes. At the second heating stage, heating was executed at 130° C. for 15 minutes.

Next, the mandrel was pulled out. Subsequently, the wrapping tape 8 was removed to obtain a cured tubular body according to the example 1. The specification and evaluation result of the example 1 are shown in the following Table 1.

Examples 2 to 6

A cured tubular body according to each example was obtained in the same manner as in the example 1 except for the specification shown in the Table 1. The specifications and evaluation results are shown in the following Table 1.

Example 7

Among the prepreg structures shown in the Table 3, a sheet s5 was replaced by an item number "2256S-10" (manufactured by Toray Industries, Inc.). The replacement enhanced a fiber content S1. A cured tubular body according to example 7 was obtained in the same manner as in the example 1 except for the prepreg structure and the specification shown in the Table 1. The specification and evaluation result are shown in the following Table 1.

Example 8

A PET film tape was used for a wrapping tape. For the PET film tape, "PET-25K" manufactured by SHIN-ETSU FILM CO., LTD. was used. A cured tubular body according to example 8 was obtained in the same manner as in the example 1 except for the specification shown in the Table 1. The specification and evaluation result are shown in the following Table 1.

Example 9

An integrated tape was used for a wrapping tape. The integrated tape is obtained by integrating "NYLON TAFFETA" having a width of 15 mm and a thickness of 100 μm and a PP film tape having a width of 15 mm and a thickness of 30 μm by heating and contact bonding. The integrated tape has a thickness of 115 μm. "NYLON TAFFETA (trade name)" is sold by Kinki Tape co., ltd. The "NYLON TAFFETA" is a tape obtained by weaving a nylon fiber through a plain weave. A type of nylon constituting the nylon fiber is Nylon 6. A cured tubular body according to example 9 was obtained in the same manner as in the example 1 except for the specification shown in the Table 1. The specification and evaluation result are shown in the following Table 1.

Example 10

A cured tubular body according to example 10 was obtained in the same manner as in the example 1 except that a temperature of a first heating stage was set to 90° C. The specification and evaluation result are shown in the following Table 1.

Example 11

A cured tubular body according to example 11 was obtained in the same manner as in the example 1 except that a temperature of a first heating stage was set to 70° C. The specification and evaluation result are shown in the following Table 1.

Example 12

A cured tubular body according to example 12 was obtained in the same manner as in the example 1 except that a temperature of a second heating stage was set to 150° C. The specification and evaluation result are shown in the following Table 1.

Example 13

A cured tubular body according to example 13 was obtained in the same manner as in the example 1 except that a time of a second heating stage was set to 5 minutes. The specification and evaluation result are shown in the following Table 1.

Example 14

A film (compound resin film) obtained by laminating the layer made of the polyolefin resin and the layer made of the polyester resin was used for a wrapping tape. The film is obtained by laminating the polypropylene (PP) film tape used in the example 1 and the PET film tape used in the example 8. The film was wound with the polypropylene film tape set to an inside (the PET film tape set to an outside). A cured tubular body according to example 14 was obtained in the same manner as in the example 1 except for the type of the tape. The specification and evaluation result are shown in the following Table 1.

Comparative Examples 1, 2 and 4

Cured tubular bodies according to comparative examples 1, 2 and 4 were obtained in the same manner as in the example 1 except for the specification shown in the Table 2. The specifications and evaluation results are shown in the following Table 2.

Comparative Example 3

A prepreg structure of comparative example 3 was the same as that of the example 7. For a wrapping tape, the "NYLON TAFFETA" was used. A cured tubular body according to comparative example 3 was obtained in the same manner as in the example 1 except for the prepreg structure and the specification shown in the Table 2. The specification and evaluation result are shown in the following Table 1.

In the comparative examples 1 and 2 and comparative examples 4 to 10, the same wrapping tape as that of the example 1 was used.

In the comparative examples 2 and 3, the first heating stage was not carried out, and the curing step was only one stage.

Comparative Example 5

A cured tubular body according to comparative example 5 was obtained in the same manner as in the example 1 except that a time of a first heating stage was set to 100 minutes. The specification and evaluation result are shown in the following Table 2.

Comparative Example 6

A cured tubular body according to comparative example 6 was obtained in the same manner as in the example 1 except that a time of a second heating stage was set to 3 minutes. The specification and evaluation result are shown in the following Table 2.

Comparative Example 7

A cured tubular body according to comparative example 7 was obtained in the same manner as in the example 1 except that a time of a second heating stage was set to 30 minutes. The specification and evaluation result are shown in the following Table 2.

Comparative Example 8

A cured tubular body according to comparative example 8 was obtained in the same manner as in the example 1 except that a temperature of a first heating stage was set to 60° C. The specification and evaluation result are shown in the following Table 2.

Comparative Example 9

A cured tubular body according to comparative example 9 was obtained in the same manner as in the example 1 except that a temperature of a second heating stage was set to 210° C. The specification and evaluation result are shown in the following Table 1.

Comparative Example 10

A cured tubular body according to comparative example 10 was obtained in the same manner as in the example 1 except that a temperature of a second heating stage was set to 100° C. The specification and evaluation result are shown in the following Table 1.

TABLE 1

Specification and Evaluation Results of Examples

| | | Unit | Example 1 | Example 2 | Example 3 | Example 4 | Example 5 | Example 6 | Example 7 | Example 8 |
|---|---|---|---|---|---|---|---|---|---|---|
| Tape winding step | Tape type | | PP | PP | PP | PP | PP | PP | PP | PET |
| | Width W1 | mm | 25 | 25 | 25 | 25 | 25 | 25 | 25 | 15 |
| | Thickness d2 | μm | 30 | 30 | 30 | 30 | 30 | 30 | 30 | 25 |
| | Tensile stress T1 | Mpa | 100 | 100 | 100 | 100 | 100 | 100 | 100 | 80 |
| Fiber content S1 | | wt % | 75 | 75 | 75 | 75 | 75 | 75 | 80 | 75 |
| Weight (Wt) of cured tubular body | | g | 48 | 48 | 48 | 48 | 48 | 48 | 44 | 48 |
| Forward flex Fj | | mm | 139 | 139 | 139 | 139 | 139 | 139 | 153 | 139 |
| First heating stage | Temperature | ° C. | 80 | 80 | 80 | 80 | 80 | 80 | 80 | 80 |
| | Time | Minute | 120 | 150 | 250 | 350 | 1440 | 4320 | 120 | 120 |
| Second heating stage | Temperature | ° C. | 130 | 130 | 130 | 130 | 130 | 130 | 130 | 130 |
| | Time | Minute | 15 | 15 | 15 | 15 | 15 | 15 | 15 | 15 |
| Three-point bending strength | | kgf | 195 | 195 | 220 | 223 | 224 | 226 | 180 | 203 |
| Void rate Rb | | % | 0.4 | 0.4 | 0.3 | 0.3 | 0.2 | 0.2 | 0.5 | 0.4 |
| Productivity | | | A | A | B | B | B | C | A | A |

| | | Unit | Example 9 | Example 10 | Example 11 | Example 12 | Example 13 | Example 14 |
|---|---|---|---|---|---|---|---|---|
| Tape winding step | Tape type | | Integrated tape | PP | PP | PP | PP | PP + PET (Composite) |
| | Width W1 | mm | 15 | 25 | 25 | 25 | 25 | 25 |
| | Thickness d2 | μm | 115 | 30 | 30 | 30 | 30 | 55 |
| | Tensile stress T1 | Mpa | 80 | 100 | 100 | 100 | 100 | 100 |
| Fiber content S1 | | wt % | 75 | 75 | 75 | 75 | 75 | 75 |
| Weight (Wt) of cured tubular body | | g | 48 | 48 | 48 | 48 | 48 | 48 |
| Forward flex Fj | | mm | 140 | 139 | 139 | 139 | 139 | 139 |
| First heating stage | Temperature | ° C. | 80 | 90 | 70 | 80 | 80 | 80 |
| | Time | Minute | 120 | 120 | 120 | 120 | 120 | 120 |

TABLE 1-continued

Specification and Evaluation Results of Examples

| | | | | | | | | |
|---|---|---|---|---|---|---|---|---|
| Second heating stage | Temperature | °C. | 130 | 130 | 130 | 150 | 130 | 130 |
| | Time | Minute | 15 | 15 | 15 | 15 | 5 | 15 |
| Three-point bending strength | | kgf | 200 | 187 | 195 | 194 | 194 | 197 |
| Void rate Rb | | % | 0.4 | 0.4 | 0.4 | 0.4 | 0.4 | 0.3 |
| Productivity | | | A | A | A | A | A | A |

Integrated tape: a wrapping tape obtained by integrating NYLON TAFFETA (width: 15 mm, thickness: 100 μm) and a PP Tape (width: 15 mm, thickness: 30 μm) by heating and contact bonding

TABLE 2

Specification and Evaluation Results of Comparative Examples

| | | Unit | Comparative Example 1 | Comparative Example 2 | Comparative Example 3 | Comparative Example 4 | Comparative Example 5 |
|---|---|---|---|---|---|---|---|
| Tape winding step | Tape type | | PP | PP | NYLON TAFFETA | PP | PP |
| | Width W1 | mm | 25 | 25 | 15 | 25 | 25 |
| | Thickness d2 | μm | 30 | 30 | 100 | 30 | 30 |
| | Tensile stress T1 | Mpa | 100 | 100 | 100 | 100 | 100 |
| Fiber content S1 | | wt % | 75 | 75 | 80 | 75 | 75 |
| Weight (Wt) of cured tubular body | | g | 48 | 48 | 44 | 48 | 48 |
| Forward flex Fj | | mm | 140 | 140 | 156 | 139 | 139 |
| First heating stage | Temperature | °C. | 80 | — | — | 80 | 80 |
| | Time | Minute | 30 | — | — | 7200 | 100 |
| Second heating stage | Temperature | °C. | 130 | 130 | 130 | 130 | 130 |
| | Time | Minute | 15 | 120 | 120 | 15 | 15 |
| Three-point bending strength | | kgf | 183 | 178 | 160 | 227 | 185 |
| Void rate Rb | | % | 0.9 | 1.0 | 1.3 | 0.2 | 0.8 |
| Productivity | | | A | A | A | D | A |

| | | Unit | Comparative Example 6 | Comparative Example 7 | Comparative Example 8 | Comparative Example 9 | Comparative Example 10 |
|---|---|---|---|---|---|---|---|
| Tape winding step | Tape type | | PP | PP | PP | PP | PP |
| | Width W1 | mm | 25 | 25 | 25 | 25 | 25 |
| | Thickness d2 | μm | 30 | 30 | 30 | 30 | 30 |
| | Tensile stress T1 | Mpa | 100 | 100 | 100 | 100 | 100 |
| Fiber content S1 | | wt % | 75 | 75 | 75 | 75 | 75 |
| Weight (Wt) of cured tubular body | | g | 48 | 48 | 48 | 48 | 48 |
| Forward flex Fj | | mm | 139 | 139 | 142 | 139 | 139 |
| First heating stage | Temperature | °C. | 80 | 80 | 60 | 80 | 80 |
| | Time | Minute | 120 | 120 | 120 | 120 | 120 |
| Second heating stage | Temperature | °C. | 130 | 130 | 130 | 210 | 100 |
| | Time | Minute | 3 | 30 | 15 | 15 | 15 |
| Three-point bending strength | | kgf | 188 | 195 | 180 | 195 | 187 |
| Void rate Rb | | % | 0.4 | 0.4 | 0.7 | 0.4 | 0.4 |
| Productivity | | | A | A | A | A | A |

TABLE 3

Prepreg Type and Prepreg Structure of Example 1

| Sheet | Tip ply number | Fiber angle (degree) | Resin type | Fiber type | Item number | Company name |
|---|---|---|---|---|---|---|
| s1 | 3 | −45 | Epoxy | M40S | 9255S-11 | Toray Industries, Inc. |
| s2 | 3 | 45 | Epoxy | M40S | 9255S-11 | Toray Industries, Inc. |
| s3 | 3 | 0 | Epoxy | T800G | 2255G-10 | Toray Industries, Inc. |
| s4 | 1 | 90 | Epoxy | M30S | 805S-3 | Toray Industries, Inc. |

TABLE 3-continued

Prepreg Type and Prepreg Structure of Example 1

| Sheet | Tip ply number | Fiber angle (degree) | Resin type | Fiber type | Item number | Company name |
|---|---|---|---|---|---|---|
| s5 | 2 | 0 | Epoxy | T800G | 2255G-10 | Toray Industries, Inc. |
| s6 | 4 | 0 | Epoxy | T800G | 2255G-10 | Toray Industries, Inc. |

Note:
The fiber angle is an angle relative to the axial direction of the shaft. The axial direction of the shaft is 0 degree.

Since the curing time is comparatively short in the examples 1 and 2, the cured tubular bodies of the examples 1 and 2 have a lower three-point bending strength than that of the examples 5 and 6. However, the cured tubular bodies of the examples 1 and 2 has a higher three-point bending strength than that of the comparative example 1.

The cured tubular body of the example 7 has a high fiber content S1 and is lightweight. The cured tubular body of the example 7 has a lower three-point bending strength than that of the other examples. However, the three-point bending strength of the example 7 is higher than that of the comparative example 3.

The wrapping tape of the polyethylene terephthalate is used for the example 8. The polyethylene terephthalate has a larger contraction percentage during heating than that of the polypropylene. Therefore, although the tensile stress T1 of the examples 8 is comparatively small, the void rate of the examples 8 is low.

The integrated tape of the example 9 has a larger contraction percentage during heating than that of the polypropylene. Therefore, although the tensile stress T1 of the example 9 is comparatively small, the void rate of the example 9 is low.

Since the curing time of the first heating stage is short in the comparative example 1, the void rate of the comparative example 1 is high. Since the first heating stage was not carried out in the comparative examples 2 and 3, the void rate of the comparative examples 2 and 3 is high.

As shown in the evaluation results of the Tables, the evaluation in each of the examples is higher than that in each of the comparative examples. From the evaluation results, advantages of the present invention are apparent.

The present invention can be applied to all FRP tubular bodies including the golf club shaft.

The above description is only illustrative and various changes can be made without departing from the scope of the present invention.

What is claimed is:

1. A method of manufacturing a tubular body by a sheet winding process, said manufacturing method comprising steps of:
   winding a fiber reinforced resin member containing a fiber and a matrix resin around a mandrel to obtain an intermediate formed body;
   winding a wrapping tape around an outer peripheral surface of the intermediate formed body with an application of a tension;
   heating the intermediate formed body having the wrapping tape wound therearound to cure the matrix resin; and
   pulling out the mandrel only after the step of heating and subsequently removing the wrapping tape to obtain a cured tubular body,
   wherein a base polymer of a base material of the wrapping tape is a polyolefin resin and/or a polyester resin, and
   the step of heating including:
   a first heating stage for heating the intermediate formed body at a temperature of 70° C. or higher and 90° C. or lower for a time of 120 minutes or longer and 4320 minutes or shorter; and
   a second heating stage for heating the intermediate formed body at a temperature of 120° C. or higher and 200° C. or lower for a time of 5 minutes or longer and 20 minutes or shorter after the first heating stage.

2. The method according to claim 1, wherein a tensile stress T1 to be applied to the wrapping tape is 20 (Mpa) or greater and 200 (Mpa) or less in the step of winding the wrapping tape.

3. The method according to claim 1, wherein an internal surface of the wrapping tape is provided with a silicone type or fluorine type coating material.

4. The method according to claim 1, wherein a fiber content S1 of the intermediate formed body is 50% by weight or greater and 92% by weight or less.

5. The method according to claim 1, wherein a wind starting end and a wind terminating end of the wrapping tape are fixed respectively to the intermediate formed body with an adhesive tape in the step of winding the wrapping tape.

6. The method according to claim 1, wherein the base material of the wrapping tape is a uniaxially-stretched film.

7. The method according to claim 1, wherein a thickness d2 of the wrapping tape is equal to or greater than 10 μm and equal to or less than 120 μm.

8. The method according to claim 1, wherein a width W1 of the wrapping tape is equal to or greater than 10 mm and equal to or less than 35 mm.

9. The method according to claim 1, wherein a tensile modulus of elasticity of the fiber is equal to or higher than 5 t/mm² and equal to or lower than 100 t/mm².

10. The method according to claim 1, wherein an average number La of a wrapping layer wound in the step of winding wrapping tape is equal to or larger than two.

11. The method according to claim 10, wherein the average number La is equal to or larger than three and equal to or less than 15.

12. The method according to claim 1, further comprising steps of:
   cutting off a portion Xt which is adjacent to a wind starting point and in which a number L1 of the wrapping layer is one; and
   cutting off a portion Yt which is adjacent to the wind terminating point and in which a number L1 of the wrapping layer is one.

13. The method according to claim 1, wherein the wrapping tape is removed after the pull-out of the mandrel in the step of pulling out the mandrel and removing the wrapping tape.

14. The method according to claim 1, wherein the temperature of the first heating stage is 85° C. or lower.

15. The method according to claim 1, wherein the temperature of the first heating stage is 80° C. or lower.

16. The method according to claim 1, wherein the temperature of the second heating stage is 130° C. or lower.

* * * * *